United States Patent Office 3,343,326
Patented Sept. 26, 1967

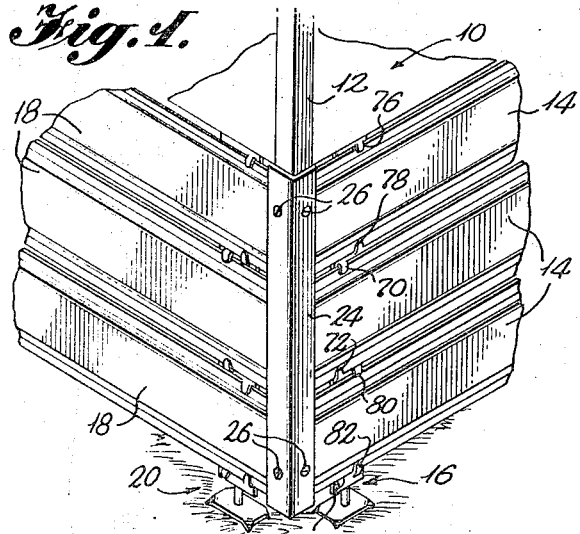

3,343,326
SKIRTING MEANS
Raymond W. Sickler and Ernest C. Zimmer,
Wellsburg, N.Y. 14894
Filed Apr. 15, 1966, Ser. No. 542,862
2 Claims. (Cl. 52—483)

The present application is a continuation-in-part of copending U.S. patent application Ser. No. 501,027, filed Oct. 22, 1965.

The present invention relates to new and novel skirting means, and more particularly to skirting means as used with mobile homes when such mobile homes are immobilized and are mounted at an elevation above the ground surface to serve as living quarters.

When a mobile home or a house trailer is parked and used as a semi-permanent residence, the bottom of the structure is normally supported in spaced relationship to the surface of the ground since contact with the ground provides undesirable chemical corrosion to the bottom of the structure, and furthermore, there is a possibility that the trailer structure will be physically damaged due to changes in the contour of the ground as caused for example by heaving of the earth due to frost.

This spacing of the bottom of the trailer structure from the ground provides an unsightly appearance to the trailer and furthermore enables drafts of air to pass beneath the trailer which tends to cause the floor of the structure to be warmer in the summer and colder in the winter, which is of course a very undesirable feature.

The present invention provides a skirting means for enclosing the space between the ground and the bottom of a mobile home, this enclosing means providing a pleasing appearance, while allowing a certain amount of ventilation beneath the mobile home and at the same time effectively shielding this space from excessive drafts. The skirting means of the present invention is also self-adjusting so that it accommodates different heights initially between the trailer structure and the ground and further will allow a certain amount of relative movement after the structure is assembled. In this manner, the skirting means of the present invention may be installed over uneven ground and where there are slopes in the ground, and further it will automatically compensate for heating of the ground due to frost and the like.

It is further important that the structure be easily and quickly installed since such skirting means will generally be erected by a trailer owner with no special tools or experience. Additionally, the structure must be adaptable for different size trailers, and in the present invention, the various skirt panels may be overlapped with one another so that they can be extended indefinitely for enclosing the space around trailers of widely varying size.

The skirting structure also is of a construction which enables corners and door openings and the like to be readily made as necessary. The skirt panels are spaced from one another a relatively small amount so as to provide adequate ventilation and air circulation beneath the trailer and at the same time these openings are of such a dimension as to prevent any substantial drafts from flowing beneath the structure. This results in the floors of the trailer being warmer in the wintertime and cooler in the summer.

In the present invention, the post means may be readily installed in position and then manually adjusted to provide the desired degree of tension to hold them in place. After this initial installation, the post means are self-adjusting. The post means also include support means which enable the individual skirt panels to be readily snapped into operative position in a quick and easy manner. The skirt panels are locked in this operative position without the need of providing any extra fasteners or the like, and the panels are held rigidly in position so that no wind rattle will occur after installation.

An object of the present invention is to provide new and novel skirting means which may be readily installed in a quick and efficient manner and wherein the skirting means may be installed in various lengths as required.

Another object of the invention is the provision of skirting means which is adjustable for different heights between a supporting surface and a structure thereabove and which compensates for uneven ground and slopes therein as well as compensating for heaving of the ground which may occur due to frost.

Still another object of the invention is to provide skirting means of such construction that it is relatively easy to make the corner structures required as well as door openings and the like.

Yet another object of the invention is to provide skirting means providing certain desirable spaces between adjacent skirt panels to permit air circulation and which at the same time prevent excessive drafts beneath the floor of the trailer to thereby enable the floors of the trailer to be warmer in the winter and cooler in the summer.

A still further object of the invention is to provide skirting means wherein the skirt panels may be simply snapped into place without requiring extra fastener means and wherein the skirt panels will be securely locked in position to prevent any wind rattle after installation.

Yet another object of the invention is the provision of skirting means which is quite simple and inexpensive in construction and yet which at the same time is quite sturdy and reliable in operation.

Other objects and many attendant advantages of the invention will become more apparent when considered in connection with the specification and accompanying drawings, wherein:

FIG. 1 is a top perspective view illustrating the skirting means in erected operative relationship beneath a structure;

FIG. 2 is an enlarged view partly broken away looking at one of the support posts shown in FIG. 1 from the rear thereof;

FIG. 3 is a sectional view taken substantially along line 3—3 of FIG. 2 looking in the direction of the arrows; and FIG. 4 is a sectional view taken substantially along line 4—4 of FIG. 2 looking in the direction of the arrows.

Referring now to the drawings wherein like reference characters designate corresponding parts throughout the several views, FIG. 1 illustrates the general over-all arrangement of the present invention wherein a portion of a mobile home or trailer is indicated generally by reference numeral 10, the trailer structure having a corner portion 12. It will be understood that the trailer structure is normally supported in spaced relationship to the ground by suitable cement blocks or the like.

The skirting means of the present invention includes a first plurality of skirt panels 14 each of which is substantially identical with the others. It will be understood that the skirt panels may be of varying number depending on the distance between the supporting surface or ground and the overlying structure. The panels 14 are supported upon a first post means 16, it being understood that a substantially identical post means is provided at spaced portions of the skirt panels, this spaced post means not being illustrated in FIG. 1.

In a similar manner, a plurality of skirt panels 18 are provided, these skirt panels also being illustrated as three in number and extending at substantially right angles to the skirt panels 14. Panels 18 are supported upon a first post means indicated generally by reference numeral 20, it being understood that an additional identical post means is provided at a spaced point for supporting the panels 18 adjacent the opposite ends thereof from that shown in FIG. 1.

A corner trim member 24 is disposed at the corner of the skirting and is secured in operative position by drilling aligned holes through this trim member and the adjacent skirt panels and then fastening the members in place by inserting metal screws 26 through the aligned holes, these metal screws being illustrated as disposed adjacent the top and bottom of the trim member.

Referring now particularly to FIGS. 2–4 inclusive, the details of construction of the post means 16 may be more clearly understood. This post means includes an upper portion 30 comprising a sheet extrusion having an integral generally cylindrical portion 32 extending from one side thereof as seen most clearly in FIG. 4 and being provided with a longitudinally extending slot 34 throughout the length thereof. Means for engaging the structure at the upper end of the post means includes a generally cylindrical member 38 having a reduced outer end portion 40 which may be provided with a point at the outer end thereof, this reduced end portion being received in a suitable hole formed in the trailer structure 10. This hole may be drilled in the structure or the sharp pointed end 40 may simply be moved into a softer material if desired. Portion 38 is provided with a peripheral groove 42 in the outer surface thereof, and a portion 44 of member 32 is crimped as indicated into the groove 42 so as to secure member 38 in the operative position shown.

The lower portion of the post means includes a rodlike member 50 which is slidably received within the lower part of portion 32 of the upper portion of the post means. A compression spring 52 is disposed within portion 32 and engages the upper end of member 50. The upper end of spring 52 is in engagement with a nut member 54 which is relatively snugly received within portion 32 and which further has a thumbscrew 56 threaded therethrough. It is apparent that thumbscrew 56 serves as a means for locking the nut 54 in any particular position within the portion 32 of the post means, and in this manner the nut 54 can be moved to different positions within portion 32 to adjust the amount of spring force applied to member 50.

The lower end of rod-like member 50 is provided with a reduced end portion 60 which terminates in a sharpened point. A base plate 62 is provided wherein the four corners 64 thereof are bent downwardly to provide four sharpened corner portions adapted to dig into a supporting surface. The reduced end portion 60 is loosely received within a central hole 66 formed in plate 62 to provide a limited universal interconnection therebetween to allow a certain amount of relative movement between the base plate and member 50. This will permit the base plate to adjust to the slope of the underlying support surface while the member 50 and the post means may remain in a generally vertical position.

The support means includes a plurality of integral tabs punched out of the material of the upper portion 30 and extending outwardly from a flat outwardly facing surface 68 as seen in FIGS. 3 and 4, the skirt panels being adapted to fit up against this flat outwardly facing surface.

The support means includes a first vertical row of integral tabs 70, 72 and 74 punched out of spaced portions of portion 30, and the support means includes a second vertical row of integral tabs 76, 78, 80 and 82 which are similarly punched out of the material of portion 30 and as shown in FIG. 2 the adjacent tabs in said respective rows provide pairs of tabs which have their base portions in substantially horizontal alignment. As seen most clearly in FIG. 3, each of these tabs is bent outwardly at an acute angle to the forward face 68, and as seen in this figure, the upper edge 14' of one of the skirt panels 14 is received under support tab 70, while the lower edge 14" of the skirt panel is received under the support tab 72. It will be understood that opposite end portions of the skirt panel will be similarly received within corresponding support tabs of another identical post means. The skirt panels are made of a suitable flexible material such as aluminum or the like which is sufficiently flexible to permit the individual panels to be snapped into the position shown with the support tabs overlapping the upper and lower edge portions of the panels.

As further illustrated in FIG. 3, an additional skirt panel is indicated by phantom line 86 in overlapping relationship with the skirt panel 14 shown in the central portion of this figure. It is apparent that the configuration of the support tabs is such that two adjacent panels in a horizontal direction can overlap one another at the end portions thereof so as to permit a substantially uninterrupted over-all appearance to be provided in the finished structure.

Turning again to FIG. 2, it should be noted that the adjacent vertical tabs 70 and 72 converge outwardly away from the outer face of portion 30 and toward one another. Similarly, support tabs 76 and 78 also converge outwardly toward one another as well as do the support tabs 80 and 82 therebelow. This outwardly converging relationship is seen most clearly in FIG. 3 wherein it is apparent that the outwarding converging support tabs 70 and 72 permit the skirt panels to be snapped into operative position.

When assembling the structure of the present invention, the upper and lower portions of the post means are first assembled as illustrated in FIG. 2, and the thumbscrew 56 and nut 54 are set in the approximate finished location to provide the desired spring force. Approximately 6 inches from a corner of the trailer, a first post means is located and plumbed. The upper end portion 40 is positioned within a suitable hole provided in the trailer, and the base plate rests upon the supporting surface or ground. Nut 54 may then be adjusted to provide the particular spring force desired. Additional post means are then similarly mounted about the perimeter of the trailer. Starting from the top and working down, each individual skirt panel is snapped into place by squeezing the bottom of the panel slightly until it snaps into place behind the support tabs. Adjacent horizontal panels will overlap one another by approximately 1½ inches.

These steps may be repeated until it is desired to locate a door or the like whereupon a suitable opening can be provided in the skirting panels with a post means at either side of such opening. The corners may be formed as previously described. If uneven ground slope is encountered, the number of horizontally extending panels may be varied so that only two panels are disposed vertically above one another or more or less may be provided as required.

In the completed installation, aproximately a ½ inch opening will be left at the top of the skirting with approximately ⅛ inch opening between the panels to allow enough air circulation for the furnace of a trailer and to prevent mildew from forming thereunder.

It is apparent from the foregoing that there is provided according to the present invention new and novel skirting means which can be readily installed in a quick and efficient manner and wherein the skirting may be of any length due to the fact that adjacent horizontal skirt panels may overlap one another. The skirting is adjustable for different heights of a structure above a support surface and is adapted to accommodate uneven ground and sloping terrain as well as heaving of the ground due to frost or the like. With the construction of the present invention, it is easy to form corners and door openings as required. The completed structure provides openings at the top of the skirting and between certain panels thereof to provide desired air circulation which results in cutting down excessive drafts beneath the trailer structure and further which provides a completed structure of pleasing appearance. The individual skirt panels may be snapped into place whereupon they are firmly locked in position without the necessity of providing extra fasteners and are held securely in place so as to prevent any wind rattle. The apparatus is quite simple and inexpensive in construction, and yet at the same time is quite sturdy and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:

1. In a skirt for screening the space between the ground and the lower edge of a trailer, comprising a plurality of substantially vertical posts of sheet material spaced from one another along said lower edge; each of said posts having a ground contacting element at one end and a trailer engaging means on the other end, said posts having a flat front supporting surface; a plurality of elongated flexible panels including a top and bottom panel; support means on said flat front surface of said post supporting said panels against said surface in a substantially parallel relationship, said support means comprising tabs spaced apart vertically on said posts a distance substantially equal to the width of a panel, said tabs being struck from the sheet material to project at an acute angle from said front supporting surface, said tabs being arranged in pairs with their base portions in alignment along a substantially common horizontal line and the bodies of the tabs of each pair extending in opposite directions substantially normal to said substantially common horizontal line, said panels having upper and lower edges that are parallel along the length of said panel, said panels extending between at least two of said posts, the adjacent edges of adjacent panels each having one edge thereof received under one tab of said pair of tabs and the other edge of said adjacent panels received under the other tab of said pair of tabs, and tabs on said posts receiving thereunder the upper and lower edges of the top and bottom panels respectively.

2. The screening skirt as defined in claim 1 wherein each of said flat front supporting surfaces of said posts includes an elongated spring and rod enclosure means on the back thereof, a spring and rod within said enclosure and said spring urging the rod outwardly of the enclosure.

References Cited

UNITED STATES PATENTS

| | | | |
|---|---|---|---|
| 235,518 | 12/1880 | Delany | 256—21 |
| 303,126 | 8/1884 | Corotz | 52—494 |
| 527,273 | 10/1894 | Fowler | 248—354 |
| 1,668,651 | 5/1928 | McKinnon | 256—22 |
| 1,716,708 | 6/1929 | Shipley | 248—354 |
| 2,520,314 | 8/1950 | Harris | 256—22 |
| 2,766,967 | 10/1956 | Roberts | 256—22 |
| 3,113,357 | 12/1963 | Reukauf | 52—155 |
| 3,218,091 | 11/1965 | Doak | 160—222 X |
| 3,245,677 | 4/1966 | Hurd | 248—216 |
| 3,256,655 | 6/1966 | Tetter | 52—127 |

FOREIGN PATENTS 385,442    1965    Switzerland.

FRANK L. ABBOTT, *Primary Examiner.*
ROBERT A. STENZEL, *Assistant Examiner.*